(12) United States Patent
Ganapathi et al.

(10) Patent No.: US 10,573,034 B2
(45) Date of Patent: Feb. 25, 2020

(54) SYSTEM AND METHOD FOR TRANSLATION OF GRAPHICS TO NEWER FORMAT USING PATTERN MATCHING

(71) Applicant: Honeywell International Inc., Morris Plains, NJ (US)

(72) Inventors: Ramakrishnan Ganapathi, Bangalore (IN); Dhanoop Alambilan Keloth, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/953,072

(22) Filed: Apr. 13, 2018

(65) Prior Publication Data
US 2019/0318513 A1 Oct. 17, 2019

(51) Int. Cl.
| G06F 16/20 | (2019.01) |
| G06T 11/20 | (2006.01) |
| G06N 5/04 | (2006.01) |
| G06F 16/51 | (2019.01) |

(52) U.S. Cl.
CPC ............ *G06T 11/203* (2013.01); *G06F 16/51* (2019.01); *G06N 5/047* (2013.01)

(58) Field of Classification Search
CPC .................. G06F 9/451; G06F 16/258; G05B 2219/31343
USPC ........................................................ 345/442
See application file for complete search history.

(56) References Cited

U.S. PATENT DOCUMENTS

| 5,255,354 | A | 10/1993 | Mahoney |
| 5,404,411 | A | 4/1995 | Banton et al. |
| 5,568,568 | A | 10/1996 | Takizawa et al. |
| 6,088,483 | A | 7/2000 | Nakano et al. |
| 7,151,854 | B2 | 12/2006 | Shen et al. |
| 7,502,519 | B2 | 3/2009 | Eichhorn et al. |
| 7,593,780 | B2 | 9/2009 | Mann et al. |
| 7,653,238 | B2 | 1/2010 | Stentiford |
| 8,229,579 | B2 | 7/2012 | Eldridge et al. |
| 8,447,076 | B2 | 5/2013 | Yamamoto et al. |

(Continued)

FOREIGN PATENT DOCUMENTS

| CN | 105512425 A | 4/2016 |
| EP | 0156343 A2 | 10/1985 |

(Continued)

OTHER PUBLICATIONS

PCT/US2019/026428 International Search Report and Written Opinion, pp. 7, dated Aug. 15, 2019.

*Primary Examiner* — Thomas J Lett

(57) ABSTRACT

A method includes receiving a legacy graphics file associated with a control system for an industrial process, the legacy graphics file comprising a plurality of legacy graphics objects including a first legacy graphics object and a second legacy graphics object. The method also includes migrating the first legacy graphics object to a first target graphics object using a one-to-one migration technique. The method further includes upon identifying the second legacy graphics object as a complex graphics object, migrating the second legacy graphics object to a second target graphics object using a pattern matching migration technique. The method also includes including the first target graphics object and the second target graphics object in a target graphics file.

17 Claims, 5 Drawing Sheets

(56) References Cited

U.S. PATENT DOCUMENTS

| | | |
|---|---|---|
| 8,516,383 B2 | 8/2013 | Bryant et al. |
| 8,629,877 B2 | 1/2014 | Bakalash et al. |
| 9,256,472 B2 | 2/2016 | Kakade et al. |
| 9,342,859 B2 | 5/2016 | Ayanam et al. |
| 9,547,291 B2 | 1/2017 | Tran et al. |
| 9,551,986 B2 | 1/2017 | Lo |
| 2002/0085020 A1 | 7/2002 | Carroll, Jr. |
| 2003/0193521 A1* | 10/2003 | Chen ............... G06F 9/451 715/762 |
| 2008/0189637 A1 | 8/2008 | Krajewski et al. |
| 2008/0189638 A1 | 8/2008 | Mody et al. |
| 2009/0153528 A1 | 6/2009 | Orr |
| 2013/0289749 A1* | 10/2013 | Mody ............ G05B 19/0426 700/83 |
| 2014/0067807 A1 | 3/2014 | Oka et al. |
| 2015/0105876 A1 | 4/2015 | Tran et al. |
| 2015/0105893 A1 | 4/2015 | Tran et al. |
| 2015/0277404 A1 | 10/2015 | Maturana et al. |
| 2018/0039487 A1 | 2/2018 | Delaney et al. |

FOREIGN PATENT DOCUMENTS

| | | |
|---|---|---|
| EP | 0717866 B1 | 11/1997 |
| WO | 03001343 | 1/2003 |
| WO | 03023711 A2 | 3/2003 |

\* cited by examiner

SYSTEM AND METHOD FOR TRANSLATION OF GRAPHICS TO NEWER FORMAT USING PATTERN MATCHING

TECHNICAL FIELD

This disclosure relates generally to industrial process control and automation systems. More specifically, this disclosure relates to a system and method for translation of industrial process graphics to a newer format using pattern matching.

BACKGROUND

Industrial process control and automation systems are often used to automate large and complex industrial processes. These types of systems routinely include sensors, actuators, and controllers. Some of the controllers typically receive measurements from the sensors and generate control signals for the actuators. Other controllers often perform higher-level functions, such as planning, scheduling, and optimization operations. A distributed control system (DCS) is often implemented in conjunction with or as part of an industrial process control and automation system. Such DCS systems include applications with graphical displays for a user to observe and control components and processes of the industrial process control and automation system.

SUMMARY

This disclosure provides a system and method for translation of industrial process graphics to a newer format using pattern matching.

In a first embodiment, a method includes receiving a legacy graphics file associated with a control system for an industrial process, the legacy graphics file comprising a plurality of legacy graphics objects including a first legacy graphics object and a second legacy graphics object. The method also includes migrating the first legacy graphics object to a first target graphics object using a one-to-one migration technique. The method further includes, upon identifying the second legacy graphics object as a complex graphics object, migrating the second legacy graphics object to a second target graphics object using a pattern matching migration technique. The method also includes including the first target graphics object and the second target graphics object in a target graphics file.

In a second embodiment, an apparatus includes at least one processing device configured to receive a legacy graphics file associated with a control system for an industrial process, the legacy graphics file comprising a plurality of legacy graphics objects including a first legacy graphics object and a second legacy graphics object. The at least one processing device is also configured to migrate the first legacy graphics object to a first target graphics object using a one-to-one migration technique. The at least one processing device is further configured to, upon identifying the second legacy graphics object as a complex graphics object, migrate the second legacy graphics object to a second target graphics object using a pattern matching migration technique. The at least one processing device is also configured to include the first target graphics object and the second target graphics object in a target graphics file.

In a third embodiment, a non-transitory computer readable medium contains instructions that when executed cause at least one processing device to receive a legacy graphics file associated with a control system for an industrial process, the legacy graphics file comprising a plurality of legacy graphics objects including a first legacy graphics object and a second legacy graphics object. The medium also contains instructions that when executed cause the at least one processing device to migrate the first legacy graphics object to a first target graphics object using a one-to-one migration technique. The medium further contains instructions that when executed cause the at least one processing device to, upon identifying the second legacy graphics object as a complex graphics object, migrate the second legacy graphics object to a second target graphics object using a pattern matching migration technique. In addition, the medium contains instructions that when executed cause the at least one processing device to include the first target graphics object and the second target graphics object in a target graphics file.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
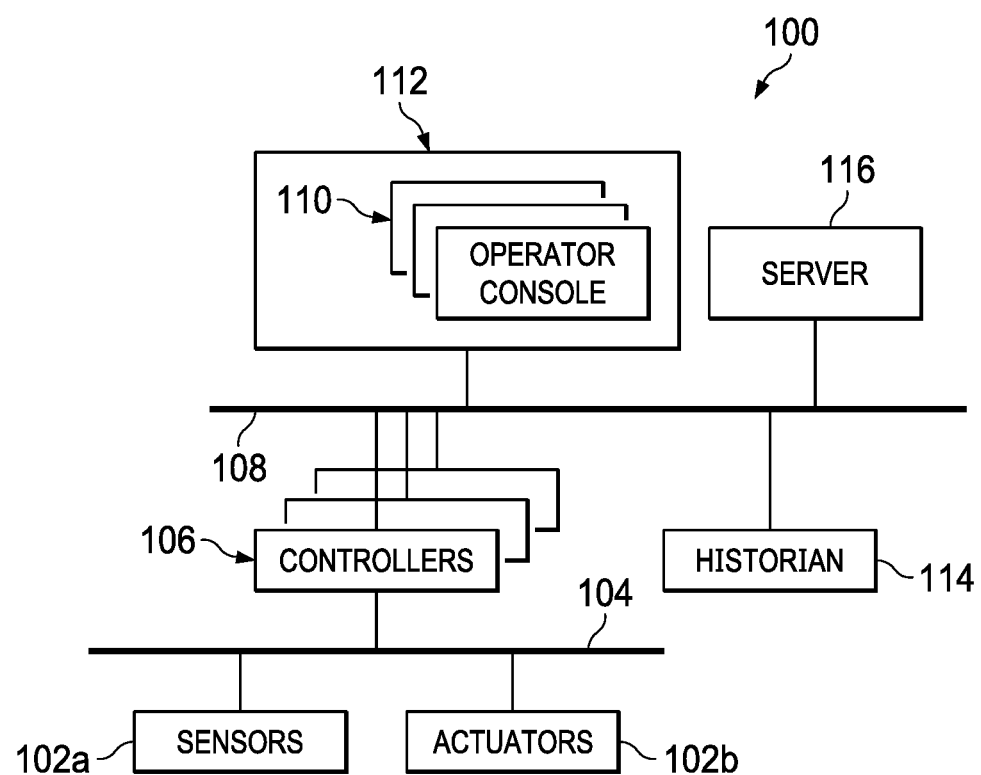
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as pressure, temperature, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network, electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 can communicate via one or more networks 108 and associated switches, firewalls, and other components.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control or other advanced predictive control. As a particular example, each controller 106 could represent a computing device running a real-time operating system, a WINDOWS operating system, or other operating system.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and alarms associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 also includes at least one historian 114 and one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100. Each server 116 denotes a computing device that executes applications for users of the operator consoles 110 or other applications. The applications could be used to support various functions for the operator consoles 110, the controllers 106, or other components of the system 100. Each server 116 could represent a computing device running a WINDOWS operating system or other operating system.

In order to provide system status, various components of the system 100 (e.g., the sensors 102, actuators 102b, and controllers 106) can be represented graphically on a display of one or more operator consoles 110. In many cases, each component is displayed as a preconfigured or custom graphic that is unique for that component or type of component. For example, when an actuator 102b is a valve, the valve can be displayed as a graphic that has the appearance of a valve. When a sensor 102a is a temperature gauge, the temperature gauge can be displayed as a graphic that has the appearance of a temperature gauge.

Generally, each control system or version of control system has a library of graphics associated with that system or version. When it is time for a migration to a new control system or version (e.g., due to obsolescence of the legacy system), the graphics representing the system components typically are migrated as well. For example, for a migration to a new DCS (distributed control system) solution (such as EXPERION by HONEYWELL), the legacy graphics can be replaced with or migrated to modern Human Machine Interface (HMI) graphics in order to provide an enhanced user interface experience.

There may be thousands of custom graphics objects used in a legacy control system. In some legacy control systems, the associated graphics builder does not have much capability to create complex elements. Thus, to generate a graphic for a complex object (e.g., a particular type of tank or motor), the project engineer would have to use multiple fundamental graphical objects (e.g., lines, dotted lines, or arcs) to create a compound graphical object to represent the complex object. Thus, some of the legacy graphics are a collection of discrete lines or arcs that are arranged together to appear to be one shape, but are stored in memory as many different objects. During a migration, re-engineering the entire graphics library can be time consuming and costly, as each plant can have hundreds or thousands of displays. Conventional migration tools are available that convert legacy graphics to modern HMI graphics. However, these tools are not suitably efficient or effective for complex legacy graphical objects, as they try to apply a 'point to point' or 'line to line' conversion to each object. Thus, such conversion tools do not recognize complex legacy objects and thus cannot migrate the objects to the new platform. Moreover, such conversion tools does not offer migration support for the wide capabilities available in modern graphics tools such as:

Rich shape and objects library;
Properties and methods associated with shapes making animation easier;
User friendly engineering capabilities;
Compliance to standards.

To address these and other issues, embodiments of this disclosure provide an image pattern matching based migration solution that enhances migration efficiency over 70-80%. For example, one or more of the components in FIG. 1 (such as the operator consoles 110, the historian 114, or the server 116) could be configured to execute a tool that a user can use to create a desired image pattern in a pattern library. Any cluster of lines and points present in a legacy graphics object can be matched against the member patterns of the pattern library. Such comparison enables the identification of the corresponding mapped object from the pattern library of the modern graphics tool. The identified object then replaces the older one. Thus, the entire library of legacy graphics is translated into the modern one. The pattern library can be enriched further by user input, and every addition or enrichment of the pattern library helps to improve efficiency and accuracy of future migrations. This enables the user to use latest shapes that follow current standards for user experience.

The disclosed embodiments provide at least the following benefits for translation of industrial process graphics to a newer format:

Improved graphics migration accuracy and efficiency;
Reduced migration effort;
Reduced cycle time and costs;
A pattern library that can grow over time and hence future configuration is reduced;
More automation and less manual engineering work;
Improved user experience with modern shapes;
Consistency among the graphics generated;
Significant reduction in the number of migrated graphics objects versus the number of legacy graphics objects (e.g., 70-80% reduction). This results in performance improvement during invocation, navigation, etc.

These benefits represent a technical advantage over conventional systems and other systems that do not provide adequate support for migration of complex legacy graphical objects. Additional details regarding the disclosed embodiments are provided below.

Although FIG. 1 illustrates one example of an industrial process control and automation system 100, various changes may be made to FIG. 1. For example, the system 100 could include any number of sensors, actuators, controllers, networks, operator stations, control rooms, historians, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment supporting translation of industrial process graphics to a newer format using pattern matching. This functionality can be used in any other suitable system.

Figure 2:
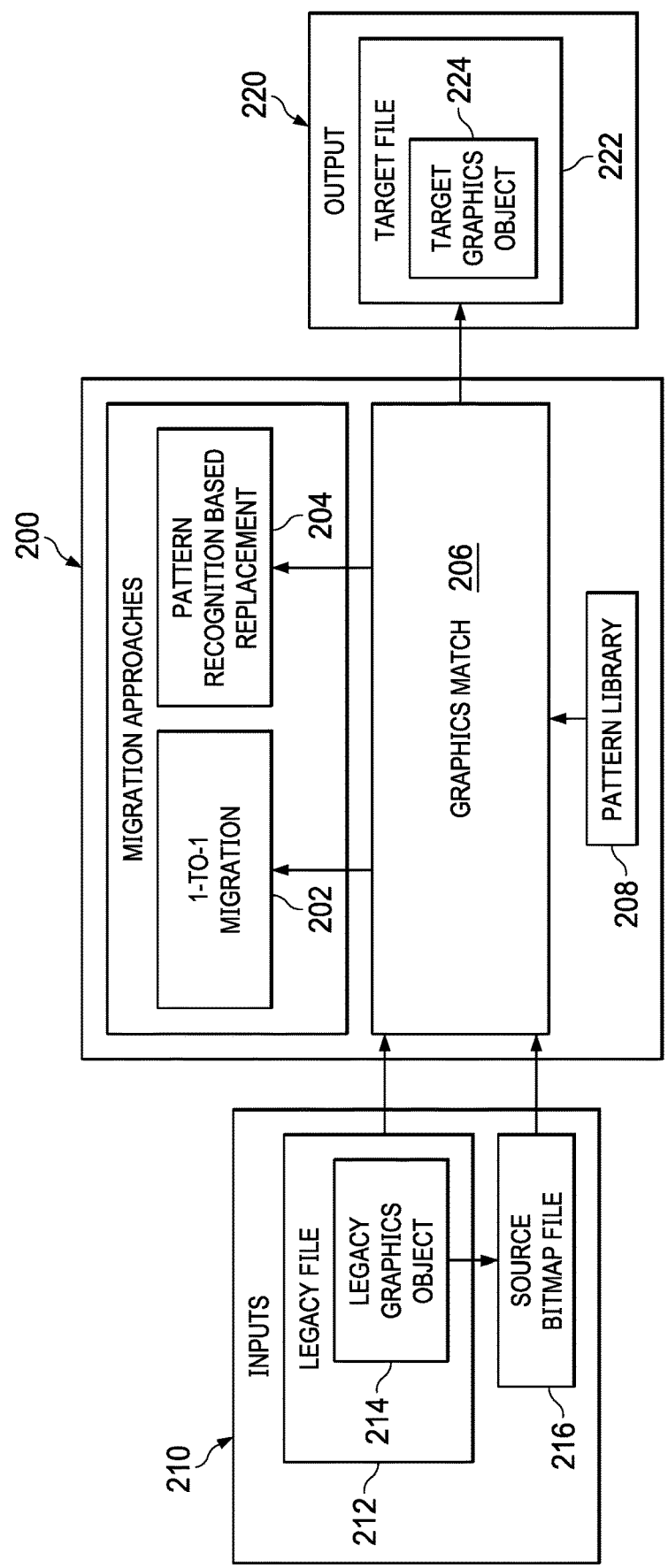
FIG. 2 illustrates a block diagram showing an example technique for translation of graphics to a newer format using pattern matching according to this disclosure.

FIG. 2 illustrates a block diagram showing an example technique 200 for translation of graphics to a newer format using pattern matching according to this disclosure. The technique 200 could, for example, be used for translation of graphics that are displayed at one or more operator consoles 110 in the system 100 of FIG. 1. However, the user technique 200 could be used with any other suitable system.

As shown in FIG. 2, the technique 200 receives one or more inputs 210 and generates one or more outputs 220. The inputs 210 include a legacy graphics file 212. The outputs 220 include a target graphics file 222.

Figure 4:
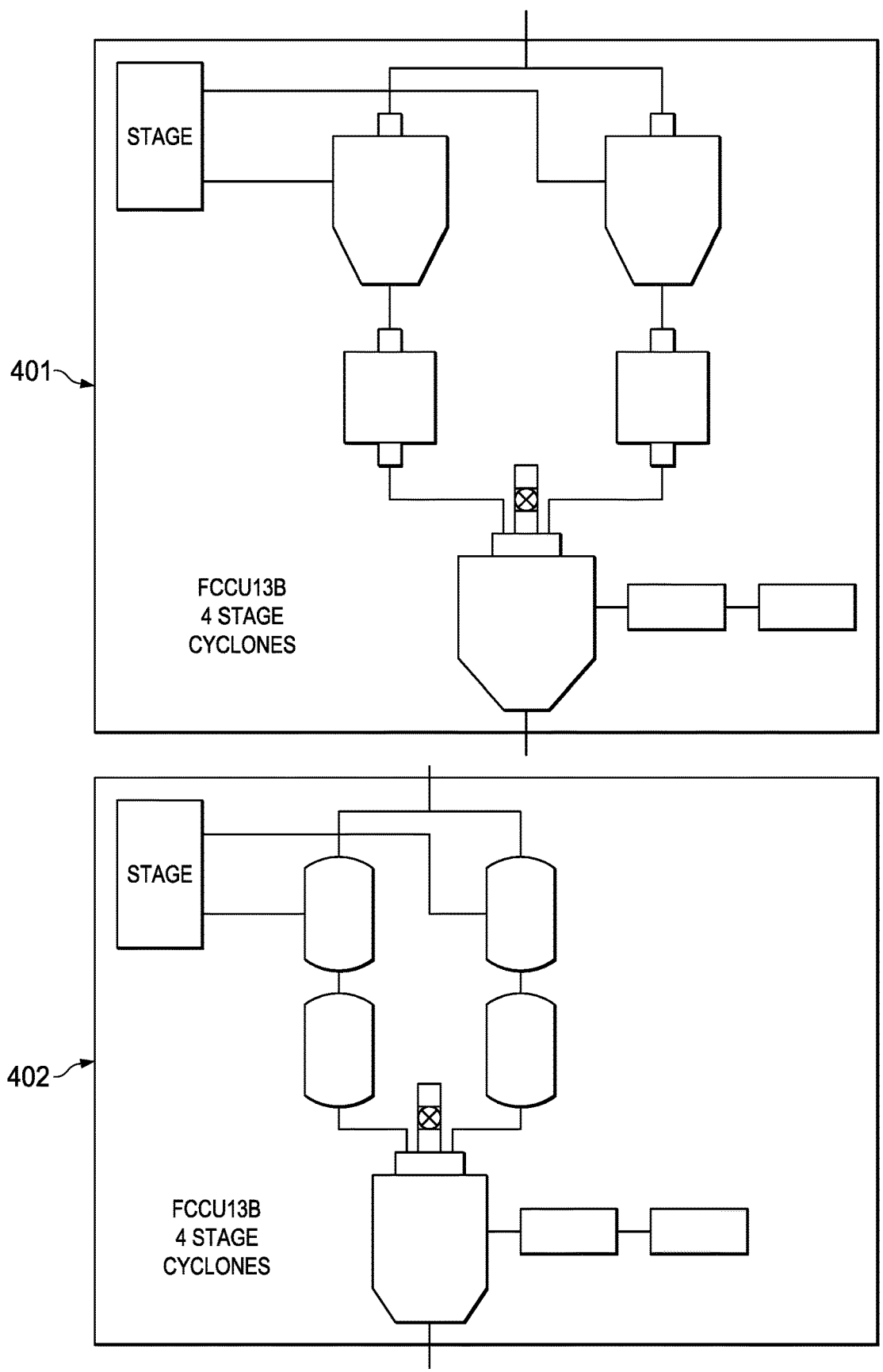
FIG. 4 illustrates a legacy image from a legacy system and a corresponding display in a new format according to this disclosure.

The legacy graphics file 212 is a graphics file containing one or more legacy graphics objects 214 for use in a legacy control system. In particular embodiments, the legacy graphics file 212 is a HONEYWELL display source graphics file having a *.DS file extension. The source bitmap file 216 is a version of the legacy graphics file 212 that has been converted into a .BMP or .PNG file. The source bitmap file 216 is generated during the technique 200 and is used as input for subsequent stages, as discussed below. Each legacy graphics file 212 generally represents one display that might be displayed in the control system. Stated differently, all of the graphics objects that appear in one display in the control system (such as shown in FIG. 4) are typically stored together as one legacy graphics file 212. Similarly, the target graphics file 222 is a graphics file containing one or more graphics objects 224 for use in a display in a target control system, such as a HONEYWELL DCS HMI display system. In particular embodiments, the target graphics file 222 can be an EXPERION PKS HMIWeb display file, which can be loaded into an EXPERION operator console.

Some conventional display migration techniques perform a one-to-one migration of each legacy graphics object and produce a target graphics object with an appearance similar to the legacy graphics object. Such techniques are inefficient and typical require substantial readjustments after migration. In addition, the one-to-one migration is unacceptable in many cases, as usability standards change and display capabilities improve over time, and the one-to-one migration cannot leverage the latest objects/shapes or properties introduced in later versions. Stated differently, if the latest user experience features in migrated graphics displays are not included, the user cannot take advantage of these features in the target system.

For example, to draw a complex graphical object like a tank or motor in some legacy systems, multiple primitive objects (e.g., individual lines, dotted lines, arcs, etc.) have to be drawn together due to technology limitations of the legacy system. However, in current DCS systems, such as those that support a target graphics file 222, complex graphical objects can be easily achieved using a single preconfigured shape or even a customized object, such as a customized HDB object.

To address these and other issues, the disclosed technique 200 uses both an existing one-to-one object migration process 202 and a new pattern recognition-based object migration process 204. The technique 200 can be integrated with a current display migration solution called a graphics match tool 206. The graphics match tool 206 is an engineering tool that performs a migration or translation of industrial graphics from a legacy system to a target system. The graphics match tool 206 takes legacy graphics objects 214 as input, allows customization, and migrates the objects 214 to equivalent target graphics objects 224. In some embodiments, the graphics match tool 206 uses a set of APIs (e.g., HMIWeb display builder (HDB) APIs) to create the target graphics objects 224.

If a legacy graphics object 214 is a single graphics object that has an equivalent graphics object in the target system, then the one-to-one object migration process 202 is performed to migrate such a legacy graphics object 214. In contrast, each plant typically includes some complex legacy graphics objects 214 (e.g., a tank, motor, etc.) that are comprised of multiple primitive objects that do not have a unique equivalent in the target system. Such complex legacy graphics objects 214 are migrated using the pattern recognition migration process 204.

Figure 3:
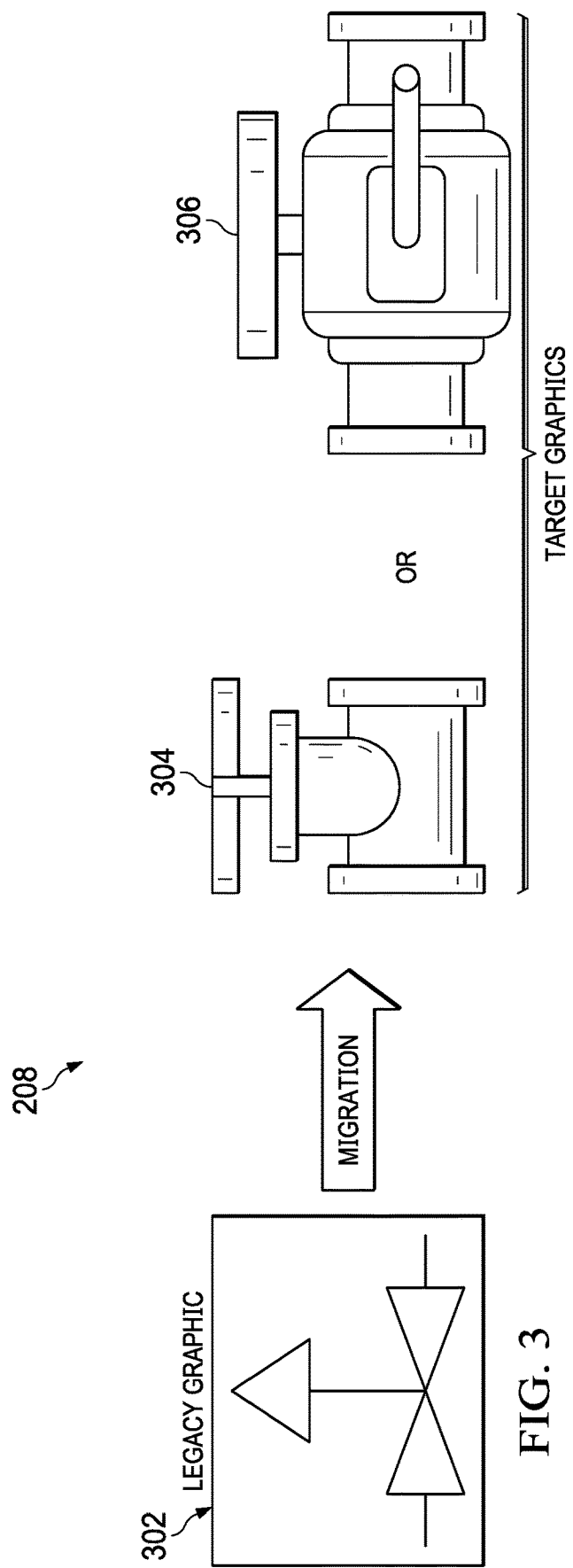
FIG. 3 illustrates an example pattern from a legacy graphic image and corresponding graphics in a new format according to this disclosure.

A pattern library 208 is associated with the pattern recognition migration process 204, and some or all identified patterns are stored in the pattern library 208. A user identifies frequently occurring object patterns from legacy displays before performing migration and creates such patterns in the pattern library 208. The user can add and modify the objects and shapes in the pattern library 208 and optimize each shape as required. The library is expected to grow after each migration. After a few migration projects, the pattern library 208 can include many frequently occurring graphics patterns such as tanks, valves, motors, etc. In many cases, a pattern is a collection of many primitive objects, such as one or more lines, polylines, polygons, rectangles, arcs, and the like. The target object associated with the legacy pattern can be an HMI shape or a single HMI element. For example, FIG. 3 illustrates example objects in the pattern library 208, which include a pattern 302 from a legacy graphic image and corresponding graphics 304, 306 in a new format. The user can create each pattern manually by cropping from one or more source bitmap files 216. However, in some embodiments, the pattern recognition migration process 204 can be extended to notify the user of frequently occurring object groups for pattern creation.

For each legacy graphics object 214 that is to be migrated, the pattern recognition migration process 204 initially generates a source bitmap file 216 from the legacy graphics object 214. The process 204 then scans the given patterns in each source bitmap file 216. For example, any pixel cluster of lines, arcs, or predetermined arrangement of points present in the source bitmap file 216 that form a pattern is matched against one or more members of the pattern library 208. In some embodiments, existing image processing techniques can be used to identify the patterns. The process 204 performs a pixel comparison in the source bitmap file 216, and finds and records the start position and size of all matching patterns. If a match of the pattern is found in the pattern library 208, then the pattern recognition migration process 204 replaces the legacy graphics object 214 with a mapped object from the pattern library 208 and deletes the legacy graphics object 214 from the legacy graphics file 212. The process 204 is repeated for each legacy graphics object 214.

The pattern recognition migration process 204 can automatically position the target graphical objects 224 at particular coordinates in the new target graphics file 222. If needed or desired, a user can then override or adjust the position manually. In the target control system, there can be both two-dimensional and three-dimensional versions of one or more target graphical objects 224. That is, one version of a target graphical object 224 may have a 2D appearance, while another version of the same target graphical object 224 may have a 3D appearance. When both 2D and 3D versions are available, the user can select the desired one for the migration.

The user can generate the source image against each legacy graphic with various methods. However, the following steps can be performed for rapid, bulk generation of the source bitmap file 216. First, a legacy display (e.g., in the form of a *.DS legacy graphics file) is converted to a target file (e.g., a *.GBP file) using an existing bulk conversion tool. For example, a user can input one or more legacy displays into the bulk conversion tool to create an equivalent target file. Then, the user can open the target file in a display builder application (e.g., GUS Display Builder), and execute one or more macros to take a screen image (e.g., a 'Print Screen' operation) of the displayed target file. The screen images can be saved as one or more bitmap files (e.g., a *.BMP or *.PNG file).

The efficiency of the pattern recognition migration process 204 can be improved by including various image filters for better identification of pattern edge and overlapping elements. In addition, the pattern recognition migration process 204 can extend the pattern matching approach to resized or stretched objects in the legacy graphic. In some embodiments, the pattern matching approach can be extended to rotated object patterns in the legacy graphic. The pattern recognition migration process 204 also enables automatic identification of each pattern from future source graphic displays. For example, the pattern recognition migration process 204 can identify an object collection that occurs repeatedly in a display and suggest the repeated pattern in the future.

FIG. 4 illustrates a legacy image 401 from a legacy system and a corresponding display 402 in a new format (e.g., an EXPERION PKS HMIWeb display) according to this disclosure. The various graphics objects shown in the legacy image 401 may be saved together in one legacy graphics file 212. The new display 402 includes various graphics objects that are saved together in one target graphics file 222. In accordance with this disclosure, the target graphics file 222 is generated from the legacy graphics file 212 using the graphics translation technique 200.

Although it may not be obvious by looking at the images 401-402, there can be a significant reduction in the number of graphics objects displayed in the new display 402 versus the number of graphics objects in the legacy image 401. This is because each "object" shown in the legacy image 401 may be stored as a collection of multiple lines, arcs, and shapes, whereas each object shown in the new display 402 is stored as one object. Depending on the type of legacy graphics objects, a migration to the new format may result in a 70-80% reduction in the number of graphics objects displayed in the new display 402. This results in performance improvement during invocation, navigation, etc.

Figure 5:
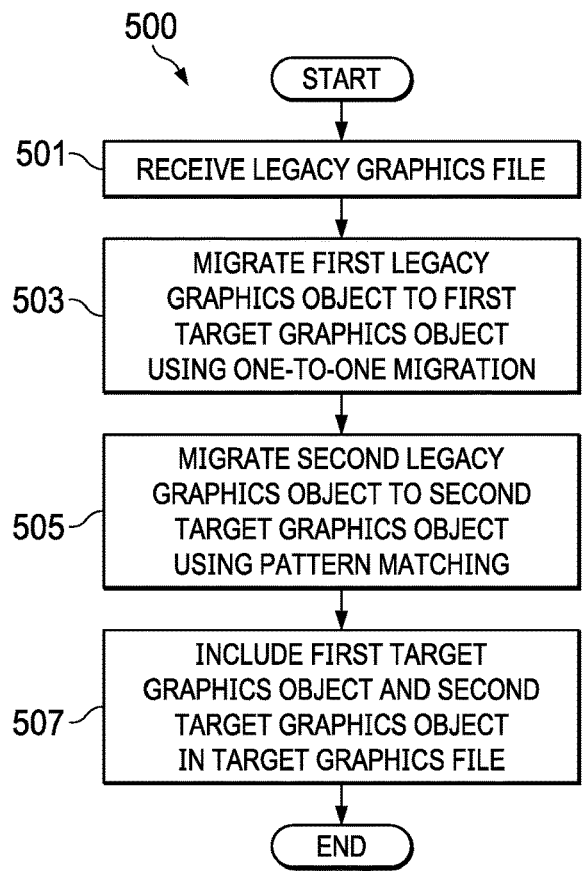
FIG. 5 illustrates an example method for translation of graphics to a newer format using pattern matching according to this disclosure.

FIG. 5 illustrates an example method 500 for translation of graphics to a newer format using pattern matching according to this disclosure. For ease of explanation, the method 500 may be described as being performed using a computing device (such as the device 600 of FIG. 6 discussed below), which could be used to implement the technique 200 of FIG. 2. However, the method 500 could be used with any suitable device or system.

At step 501, a legacy graphics file (e.g., a legacy graphics file 212) associated with a control system for an industrial process (e.g., the system 100) is received. The legacy graphics file includes a plurality of legacy graphics objects (e.g., legacy graphics objects 214) including a first legacy graphics object and a second legacy graphics object.

At step 503, the first legacy graphics object is migrated to a first target graphics object (e.g., a target graphics object 224) using a one-to-one migration technique (e.g., a process 202).

At step 505, upon identifying the second legacy graphics object as a complex graphics object, the second legacy graphics object is migrated to a second target graphics object using a pattern matching migration technique (e.g., a pattern recognition migration process 204). The pattern matching migration technique includes generating a bitmap of the second legacy graphics object, identifying one or more patterns in the bitmap, matching the one or more patterns to a second pattern in a pattern library, and replacing the second legacy graphics object with the second target graphics object that matches the second pattern in the pattern library.

At step 507, the first target graphics object and the second target graphics object are included in a target graphics file (e.g., a target graphics file 222).

Although FIG. 5 illustrates one example of a method 500 for translation of graphics to a newer format using pattern matching, various changes may be made to FIG. 5. For example, while shown as a series of steps, various steps shown in FIG. 5 could overlap, occur in parallel, occur in a different order, or occur multiple times. Moreover, some steps could be combined or removed and additional steps could be added according to particular needs.

Figure 6:
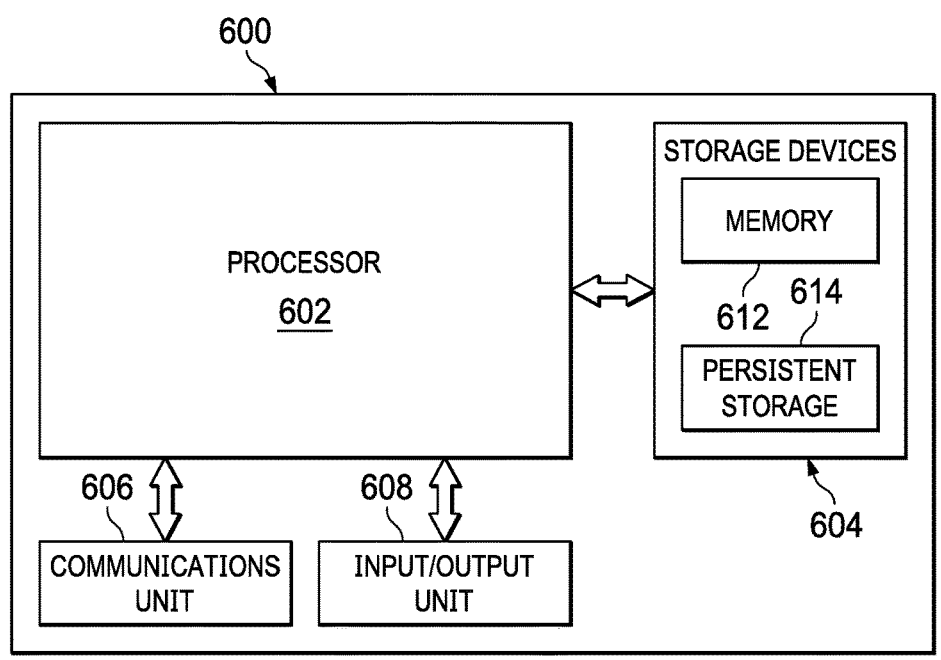
FIG. 6 illustrates an example device supporting translation of graphics to a newer format using pattern matching according to this disclosure.

FIG. 6 illustrates an example device 600 supporting translation of graphics to a newer format using pattern matching according to this disclosure. The device 600 could, for example, represent the operator consoles 110, the historian 114, or the server 116 of FIG. 1. However, these components could be implemented using any other suitable device or system, and the device 600 could be used in any other suitable system.

As shown in FIG. 6, the device 600 includes at least one processor 602, at least one storage device 604, at least one communications unit 606, and at least one input/output (I/O) unit 608. Each processor 602 can execute instructions, such as those implementing the techniques described above that may be loaded into a memory 612. Each processor 602 denotes any suitable processing device, such as one or more microprocessors, microcontrollers, digital signal processors, application specific integrated circuits (ASICs), field programmable gate arrays (FPGAs), or discrete circuitry.

The memory 612 and a persistent storage 614 are examples of storage devices 604, which represent any structure(s) capable of storing and facilitating retrieval of information (such as data, program code, and/or other suitable information on a temporary or permanent basis). The memory 612 may represent a random access memory or any other suitable volatile or non-volatile storage device(s). The persistent storage 614 may contain one or more components or devices supporting longer-term storage of data, such as a read only memory, hard drive, Flash memory, or optical disc. The memory 612 or the persistent storage 614 may be configured to store information and data associated with automatic logging of events in a process control and automation system.

The communications unit 606 supports communications with other systems or devices. For example, the communications unit 606 could include a network interface card or a wireless transceiver facilitating communications over a wired or wireless network (such as the network 108). The communications unit 606 may support communications through any suitable physical or wireless communication link(s).

The I/O unit 608 allows for input and output of data. For example, the I/O unit 608 may provide a connection for user input through a keyboard, mouse, keypad, touchscreen, or other suitable input device. The I/O unit 608 may also send output to a display, printer, or other suitable output device.

Although FIG. 6 illustrates one example of a device 600 supporting translation of graphics to a newer format using pattern matching, various changes may be made to FIG. 6. For example, various components in FIG. 6 could be combined, further subdivided, or omitted and additional components could be added according to particular needs. Also, computing devices can come in a wide variety of configurations, and FIG. 6 does not limit this disclosure to any particular configuration of computing device.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving a legacy graphics file associated with a control system for an industrial process, the legacy graphics file comprising a plurality of legacy graphics objects including a first legacy graphics object and a second legacy graphics object;
   migrating the first legacy graphics object to a first target graphics object using a one-to-one migration technique;
   upon identifying the second legacy graphics object as a complex graphics object, migrating the second legacy graphics object to a second target graphics object using a pattern matching migration technique; and
   including the first target graphics object and the second target graphics object in a target graphics file wherein the pattern matching migration technique comprises:
      generating a bitmap of the second legacy graphics object;
      identifying one or more patterns in the bitmap;
      matching the one or more patterns to a second pattern in a pattern library; and
      replacing the second legacy graphics object with the second target graphics object that matches the second pattern in the pattern library.

2. The method of claim 1, wherein each of the one or more patterns in the bitmap comprises a pixel cluster forming a line, an arc, or a predetermined arrangement of points.

3. The method of claim 1, wherein the pattern library comprises multiple legacy patterns and at least one target graphics object corresponding to each of the multiple legacy patterns.

4. The method of claim 1, wherein the legacy graphics file is associated with an older version of the control system and the target graphics file is associated with a newer version of the control system.

5. The method of claim 4, further comprising:
   operating the newer version of the control system using the target graphics file to control the industrial process.

6. The method of claim 1, wherein the legacy graphics file comprises thousands of legacy graphics objects.

7. An apparatus comprising:
   at least one processing device configured to:
      receive a legacy graphics file associated with a control system for an industrial process, the legacy graphics file comprising a plurality of legacy graphics objects including a first legacy graphics object and a second legacy graphics object;
      migrate the first legacy graphics object to a first target graphics object using a one-to-one migration technique;
      upon identifying the second legacy graphics object as a complex graphics object, migrate the second legacy graphics object to a second target graphics object using a pattern matching migration technique; and
      include the first target graphics object and the second target graphics object in a target graphics file wherein the at least one processing device develops the pattern matching migration technique by:
         generating a bitmap of the second legacy graphics object;
         identifying one or more patterns in the bitmap;
         matching the one or more patterns to a second pattern in a pattern library; and
         replacing the second legacy graphics object with the second target graphics object that matches the second pattern in the pattern library.

8. The apparatus of claim 7, wherein each of the one or more patterns in the bitmap comprises a pixel cluster forming a line, an arc, or a predetermined arrangement of points.

9. The apparatus of claim 7, wherein the pattern library comprises multiple legacy patterns and at least one target graphics object corresponding to each of the multiple legacy patterns.

10. The apparatus of claim 7, wherein the legacy graphics file is associated with an older version of the control system and the target graphics file is associated with a newer version of the control system.

11. The apparatus of claim 10, wherein the at least one processing device is further configured to:
   operate the newer version of the control system using the target graphics file to control the industrial process.

12. The apparatus of claim 7, wherein the legacy graphics file comprises thousands of legacy graphics objects.

13. A non-transitory computer readable medium containing instructions that when executed cause at least one processing device to:
   receive a legacy graphics file associated with a control system for an industrial process, the legacy graphics file comprising a plurality of legacy graphics objects including a first legacy graphics object and a second legacy graphics object;
   migrate the first legacy graphics object to a first target graphics object using a one-to-one migration technique;
   upon identifying the second legacy graphics object as a complex graphics object, migrate the second legacy graphics object to a second target graphics object using a pattern matching migration technique; and
   include the first target graphics object and the second target graphics object in a target graphics file wherein the pattern matching migration technique comprises:
      generating a bitmap of the second legacy graphics object;
      identifying one or more patterns in the bitmap;
      matching the one or more patterns to a second pattern in a pattern library; and
      replacing the second legacy graphics object with the second target graphics object that matches the second pattern in the pattern library.

14. The non-transitory computer readable medium of claim 13, wherein each of the one or more patterns in the bitmap comprises a pixel cluster forming a line, an arc, or a predetermined arrangement of points.

15. The non-transitory computer readable medium of claim 13, wherein the pattern library comprises multiple legacy patterns and at least one target graphics object corresponding to each of the multiple legacy patterns.

16. The non-transitory computer readable medium of claim 13, wherein the legacy graphics file is associated with an older version of the control system and the target graphics file is associated with a newer version of the control system.

17. The non-transitory computer readable medium of claim 16, further containing instructions that when executed cause the at least one processing device to:
operate the newer version of the control system using the target graphics file to control the industrial process.

\* \* \* \* \*